(12) United States Patent
Deets, Jr.

(10) Patent No.: US 10,594,647 B2
(45) Date of Patent: Mar. 17, 2020

(54) GENERATING AN INTERFACE IDENTIFYING TO A USER CONTENT ITEMS PROVIDED TO GROUPS MAINTAINED BY AN ONLINE SYSTEM THAT INCLUDE THE USER

(71) Applicant: Facebook, Inc., Menlo Park, CA (US)

(72) Inventor: Charles Donald Deets, Jr., Palo Alto, CA (US)

(73) Assignee: Facebook, Inc., Menlo Park, CA (US)

(*) Notice: Subject to any disclaimer, the term of this patent is extended or adjusted under 35 U.S.C. 154(b) by 564 days.

(21) Appl. No.: 15/372,344

(22) Filed: Dec. 7, 2016

(65) Prior Publication Data

US 2018/0159811 A1 Jun. 7, 2018

(51) Int. Cl.
*G06F 9/50* (2006.01)
*H04L 12/58* (2006.01)
*H04L 29/08* (2006.01)

(52) U.S. Cl.
CPC ............ *H04L 51/32* (2013.01); *H04L 67/306* (2013.01)

(58) Field of Classification Search
CPC ....................................................... H04L 51/32
See application file for complete search history.

(56) References Cited

U.S. PATENT DOCUMENTS

| 9,110,953 B2* | 8/2015 | Steinberg | H04N 21/454 |
| 2013/0205215 A1* | 8/2013 | Dunn | H04L 41/22 |
| | | | 715/738 |
| 2017/0359290 A1* | 12/2017 | Hsu | H04L 51/16 |

* cited by examiner

*Primary Examiner* — Suraj M Joshi
(74) *Attorney, Agent, or Firm* — Fenwick & West LLP (57) ABSTRACT

An online system maintains groups of online system users. When content is provided to a group, the online system presents the content to users included in the group. To allow a user to more easily access content provided to groups including the user, the online system identifies groups including the user and retrieves content items provided to the identified groups. The online system provides at least a set of the retrieved content items to an application executing on a client device associated with the user along with instructions for generating an interface. Executing the instructions causes the client device to generate an interface that presents representations of the retrieved content items in a portion of a display and describes the identified groups in an additional portion of the display. Based on interactions received from the user, the client device modifies representations of the retrieved content items presented to the user.

20 Claims, 3 Drawing Sheets

GENERATING AN INTERFACE IDENTIFYING TO A USER CONTENT ITEMS PROVIDED TO GROUPS MAINTAINED BY AN ONLINE SYSTEM THAT INCLUDE THE USER

BACKGROUND

This disclosure generally relates to presenting content to users of an online system, and in particular, to presenting content provided to one or more groups of users maintained by the online system that include the user.

An online system, such as a social networking system, allows its users to connect to and communicate with other online system users. Users may create profiles on an online system that are tied to their identities and include information about the users, such as interests and demographic information. The users may be individuals or entities such as corporations or charities.

Additionally, an online system may maintain groups of users, allowing a user to provide content to a group for presentation to each user included in the group. A group may be associated with a topic, a location, or with any other suitable characteristic, so a user included in the group may more easily view or share content associated with the characteristic associated with the group. Many online systems present a user with a feed of content including content from various users, as well as content provided to one or more groups including the user. While this allows an online system user to easily access a range of content, a feed presented to a user may include more content than the user can easily review. For example, a user who is a member of multiple groups may be unable to identify content provided to various groups via a feed of content, as the feed may include more content than the user can readily review. This may cause a user to overlook various content, such as content provided to groups including the user. As an online system may select content for presentation to a user based on prior user interactions with content, the user's inability to identify content provided to one or more groups prevents the user from interacting with content provided to the groups, which may prevent the online system from subsequently presenting the user with other content provided to the groups.

SUMMARY

Users of an online system communicate messages or other content to each other via the online system. To simplify communication of content, the online system may maintain various groups each including one or more users of the online system. A user may communicate content to a group, which causes the online system to present the content to the users included in the group. A user may provide content to a group including the user for distribution to other users in the group or may view or otherwise access content associated with the including the user.

To allow a user included in multiple groups maintained by the online system to more easily access or interact with content provided to one or more of the groups, when the online system receives a request for content from a client device associated with a user, the online system identifies one or more groups that include the user. For example, the online system receives a request for content from an application associated with the online system and executing on a client device that identifies the user. From stored information identifying groups of users, the online system identifies groups including the user. In some embodiments, the online system identifies each group including the user; alternatively, the online system identifies a set of groups including the user.

The online system retrieves content items provided to the identified groups. In some embodiments, the online system retrieves content items provided to one or more of identified groups within a threshold amount of time from a time when the request for content was received. The online system may additionally or alternatively retrieves content items provided to one or more of the identified groups with which the online system has not associated information indicating that the user accessed. The online system transmits the retrieved content items and information describing identified groups including the user to which the retrieved content items were provided to the client device from which the request for content was received. In some embodiments, the online system associates a name or other identifier of an identified group to which a retrieved content item was provided with each retrieved content item and transmits the name or other identifier of the identified group associated with a received content item along with the received content item. The online system may also transmit information describing one or more of the identified groups that include the user to the client device. For example, the online system transmits names or other identifiers of each of at least a set of the identified groups including the user to the client device.

Additionally the online system provides instructions to the client device associated with the user that, when executed by the client device, generate an interface including one or more of the retrieved content items. In various embodiments, the interface also includes information identifying one or more of the identified groups including the user. For example, executing the instructions causes the client device to present one or more of the retrieved content items in a portion of a display device of the client device and to present information identifying one or more of the identified groups in an additional portion of the display device of the client device. In some embodiments, the interface presents a portion of a retrieved content item and presents representations of one or more additional retrieved content items in the portion of the display device behind the portion of the retrieved content item. If the client device receives one or more interactions with the portion of the display device presenting the representation of the retrieved content item, the client device presents a representation of an alternative retrieved content item in the portion of the display device. For example, if the client device receives a particular gesture with the portion of the display device from the user, the client device modifies the portion of the display device to present a representation of another retrieved content item initially presented behind the portion of the retrieved content item. Hence, various interactions with the portion of the display device presenting the representation of the retrieved content item allows the user to view different retrieved content items that were provided to one or more groups including the user.

In various embodiments, the client device performs various actions depending on received user interactions with the interface. For example, if the user contacts an area of the portion of the display device presenting the representation of the retrieved content item, the client device modifies the interface to present the retrieved content item. As another example, if the user performs a gesture with the portion of the display device presenting the representation of the retrieved content item, the client device communicates an indication to the online system that the user has accessed the retrieved content item and presents a representation of an alternative retrieved content item via the portion. In an additional example, if the user performs an alternative gesture with the portion of the display device presenting the representation of the retrieved content item, the client device communicates an indication to the online system identifying the retrieved content item and an instruction to store the retrieved content item for subsequent presentation to the user that the user has accessed the retrieved content item and presents a representation of an alternative retrieved content item via the portion. Hence, the interface presented by the client device allows the user to easily access content provided to various groups that include the user.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

System Architecture

Figure 1:
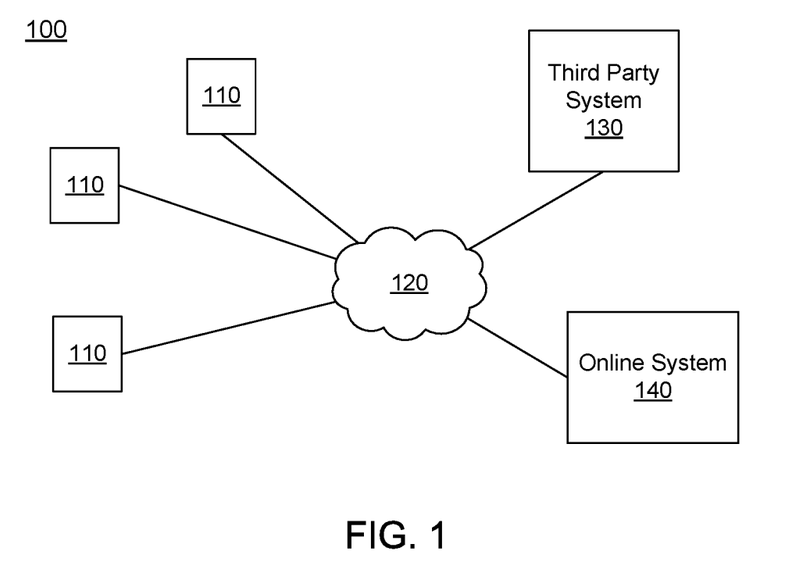
FIG. 1 is a block diagram of a system environment in which an online system operates, in accordance with an embodiment.

FIG. 1 is a high level block diagram of a system environment 100 for an online system 140. The system environment 100 shown by FIG. 1 comprises one or more client devices 110, a network 120, one or more third-party systems 130, and the online system 140. In alternative configurations, different and/or additional components may be included in the system environment 100. For example, the online system 140 is a social networking system, a content sharing network, or another system providing content to users.

The client devices 110 are one or more computing devices capable of receiving user input as well as transmitting and/or receiving data via the network 120. In one embodiment, a client device 110 is a conventional computer system, such as a desktop or laptop computer. Alternatively, a client device 110 may be a device having computer functionality, such as a personal digital assistant (PDA), a mobile telephone, a smartphone or another suitable device. A client device 110 is configured to communicate via the network 120. In one embodiment, a client device 110 executes an application allowing a user of the client device 110 to interact with the online system 140. For example, a client device 110 executes a browser application to enable interaction between the client device 110 and the online system 140 via the network 120. In another embodiment, a client device 110 interacts with the online system 140 through an application programming interface (API) running on a native operating system of the client device 110, such as IOS® or ANDROID™.

The client devices 110 are configured to communicate via the network 120, which may comprise any combination of local area and/or wide area networks, using both wired and/or wireless communication systems. In one embodiment, the network 120 uses standard communications technologies and/or protocols. For example, the network 120 includes communication links using technologies such as Ethernet, 802.11, worldwide interoperability for microwave access (WiMAX), 3G, 4G, code division multiple access (CDMA), digital subscriber line (DSL), etc. Examples of networking protocols used for communicating via the network 120 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 120 may be represented using any suitable format, such as hypertext markup language (HTML) or extensible markup language (XML). In some embodiments, all or some of the communication links of the network 120 may be encrypted using any suitable technique or techniques.

One or more third party systems 130 may be coupled to the network 120 for communicating with the online system 140, which is further described below in conjunction with FIG. 2. In one embodiment, a third party system 130 is an application provider communicating information describing applications for execution by a client device 110 or communicating data to client devices 110 for use by an application executing on the client device. In other embodiments, a third party system 130 provides content or other information for presentation via a client device 110. A third party website 130 may also communicate information to the online system 140, such as advertisements, content, or information about an application provided by the third party system 130.

Figure 2:
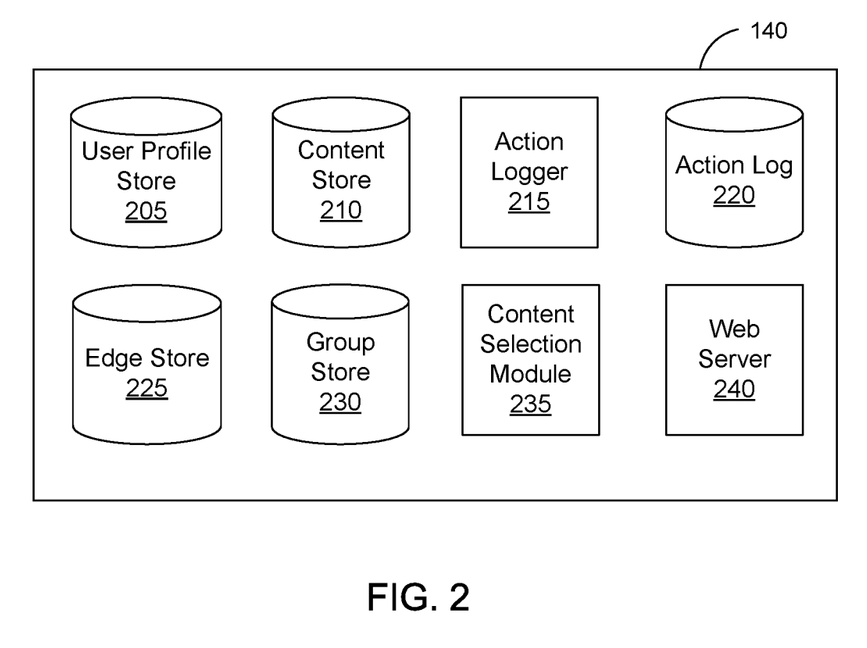
FIG. 2 is a block diagram of an online system, in accordance with an embodiment.

FIG. 2 is an example block diagram of architecture of the online system 140. The online system 140 shown in FIG. 2 includes a user profile store 205, a content store 210, an action logger 215, an action log 220, an edge store 225, a group store 230, a content selection module 235, and a web server 240. In other embodiments, the online system 140 may include additional, fewer, or different components for various applications. Conventional components such as network interfaces, security functions, load balancers, failover servers, management and network operations consoles, and the like are not shown so as to not obscure the details of the system architecture.

Each user of the online system 140 is associated with a user profile, which is stored in the user profile store 205. A user profile includes declarative information about the user that was explicitly shared by the user and may also include profile information inferred by the online system 140. In one embodiment, a user profile includes multiple data fields, each describing one or more attributes of the corresponding user of the online system 140. Examples of information stored in a user profile include biographic, demographic, and other types of descriptive information, such as work experience, educational history, gender, hobbies or preferences, location and the like. A user profile may also store other information provided by the user, for example, images or videos. In certain embodiments, images of users may be tagged with information identifying the online system users displayed in an image, with information identifying the images in which a user is tagged stored in the user profile of the user. A user profile in the user profile store 205 may also maintain references to actions by the corresponding user performed on content items in the content store 210 and stored in the action log 220.

While user profiles in the user profile store 205 are frequently associated with individuals, allowing individuals to interact with each other via the online system 140, user profiles may also be stored for entities such as businesses or organizations. This allows an entity to establish a presence on the online system 140 for connecting and exchanging content with other online system users. The entity may post information about itself, about its products or provide other information to users of the online system 140 using a brand page associated with the entity's user profile. Other users of the online system 140 may connect to the brand page to receive information posted to the brand page or to receive information from the brand page. A user profile associated with the brand page may include information about the entity itself, providing users with background or informational data about the entity.

The content store 210 stores objects that each represent various types of content. Examples of content represented by an object include a page post, a status update, a photograph, a video, a link, a shared content item, a gaming application achievement, a check-in event at a local business, a brand page, or any other type of content. Online system users may create objects stored by the content store 210, such as status updates, photos tagged by users to be associated with other objects in the online system 140, events, groups or applications. In some embodiments, objects are received from third-party applications or third-party applications separate from the online system 140. In one embodiment, objects in the content store 210 represent single pieces of content, or content "items." Hence, online system users are encouraged to communicate with each other by posting text and content items of various types of media to the online system 140 through various communication channels. This increases the amount of interaction of users with each other and increases the frequency with which users interact within the online system 140.

The action logger 215 receives communications about user actions internal to and/or external to the online system 140, populating the action log 220 with information about user actions. Examples of actions include adding a connection to another user, sending a message to another user, uploading an image, reading a message from another user, viewing content associated with another user, attending an event posted by another user, among others. In addition, a number of actions may involve an object and one or more particular users, so these actions are associated with the particular users as well and stored in the action log 220.

The action log 220 may be used by the online system 140 to track user actions on the online system 140, as well as actions on third party systems 130 that communicate information to the online system 140. Users may interact with various objects on the online system 140, and information describing these interactions is stored in the action log 220. Examples of interactions with objects include: commenting on posts, sharing links, and checking-in to physical locations via a client device 110, accessing content items, and any other suitable interactions. Additional examples of interactions with objects on the online system 140 that are included in the action log 220 include: commenting on a photo album, communicating with a user, establishing a connection with an object, joining an event, joining a group, creating an event, authorizing an application, using an application, expressing a preference for an object ("liking" the object), and engaging in a transaction. Additionally, the action log 220 may record a user's interactions with advertisements on the online system 140 as well as with other applications operating on the online system 140. In some embodiments, data from the action log 220 is used to infer interests or preferences of a user, augmenting the interests included in the user's user profile and allowing a more complete understanding of user preferences.

The action log 220 may also store user actions taken on a third party system 130, such as an external website, and communicated to the online system 140. For example, an e-commerce website may recognize a user of an online system 140 through a social plug-in enabling the e-commerce website to identify the user of the online system 140. Because users of the online system 140 are uniquely identifiable, e-commerce web sites, such in the preceding example, may communicate information about a user's actions outside of the online system 140 to the online system 140 for association with the user. Hence, the action log 220 may record information about actions users perform on a third party system 130, including webpage viewing histories, advertisements that were engaged, purchases made, and other patterns from shopping and buying. Additionally, actions a user performs via an application associated with a third party system 130 and executing on a client device 110 may be communicated to the action logger 215 by the application for recordation and association with the user in the action log 220.

In various embodiments, the action logger 215 receives information from a client device 110 describing interactions by a user of the online system 140 via the client device 110 and communicates the information to the action log 220. This allows the action log 220 to maintain information describing interactions by the online system user received via the client device 110. For example, the action logger 215 receives information from a client device 110 describing one or more gestures from the user received by the client device 110, determines actions associated with the described gestures, and identifies the user and the determined actions to the action log 220 for storage.

In one embodiment, the edge store 225 stores information describing connections between users and other objects on the online system 140 as edges. Some edges may be defined by users, allowing users to specify their relationships with other users. For example, users may generate edges with other users that parallel the users' real-life relationships, such as friends, co-workers, partners, and so forth. Other edges are generated when users interact with objects in the online system 140, such as expressing interest in a page on the online system 140, sharing a link with other users of the online system 140, and commenting on posts made by other users of the online system 140.

An edge may include various features each representing characteristics of interactions between users, interactions between users and objects, or interactions between objects. For example, features included in an edge describe a rate of interaction between two users, how recently two users have interacted with each other, a rate or an amount of information retrieved by one user about an object, or numbers and types of comments posted by a user about an object. The features may also represent information describing a particular object or user. For example, a feature may represent the level of interest that a user has in a particular topic, the rate at which the user logs into the online system 140, or information describing demographic information about the user. Each feature may be associated with a source object or user, a target object or user, and a feature value. A feature may be specified as an expression based on values describing the source object or user, the target object or user, or interactions between the source object or user and target object or user; hence, an edge may be represented as one or more feature expressions.

The edge store 225 also stores information about edges, such as affinity scores for objects, interests, and other users. Affinity scores, or "affinities," may be computed by the online system 140 over time to approximate a user's interest in an object or in another user in the online system 140 based on the actions performed by the user. A user's affinity may be computed by the online system 140 over time to approximate the user's interest in an object, in a topic, or in another user in the online system 140 based on actions performed by the user. Computation of affinity is further described in U.S. patent application Ser. No. 12/978,265, filed on Dec. 23, 2010, U.S. patent application Ser. No. 13/690,254, filed on Nov. 30, 2012, U.S. patent application Ser. No. 13/689,969, filed on Nov. 30, 2012, and U.S. patent application Ser. No. 13/690,088, filed on Nov. 30, 2012, each of which is hereby incorporated by reference in its entirety. Multiple interactions between a user and a specific object may be stored as a single edge in the edge store 225, in one embodiment. Alternatively, each interaction between a user and a specific object is stored as a separate edge. In some embodiments, connections between users may be stored in the user profile store 205, or the user profile store 205 may access the edge store 225 to determine connections between users.

The group store 230 includes information identifying various groups of users. A group is associated with a group identifier stored by the group store 230 that uniquely identifies the group. One or more identifiers associated with users are associated with the group identifier to identify users of social networking system 140 included in the group. Other information may be associated with a group identifier, such as a name identifying a group corresponding to the group identifier, a description associated with the group, descriptive information associated with the group (e.g., a location), or other suitable information. Additionally, one or more content identifiers specifying content items are associated with a group identifier to identify content items associated with a group associated with the group identifier. If a content item, such as a message, is communicated to a group, the message is communicated to users associated with the group. Hence, maintaining a group allows content to be more easily communicated to users within the group by allowing content to be communicated to the group rather than communicated to various individual users. A group may be generated by a user of the social networking system 140 identifying users associated with the group or the social networking system 140 may generate one or more groups based on characteristics associated with users of the social networking system 140. Additionally a user's interactions with a group are identified in the action log 220 or in the group store 230 by associating a group identifier with information describing an interaction with the group.

The content selection module 235 selects one or more content items for communication to a client device 110 to be presented to a user. Content items eligible for presentation to the user are retrieved from the content store 210 or from another source by the content selection module 235, which selects one or more of the content items for presentation to the viewing user. A content item eligible for presentation to the user is a content item associated with at least a threshold number of targeting criteria satisfied by characteristics of the user or is a content item that is not associated with targeting criteria. In various embodiments, the content selection module 235 includes content items eligible for presentation to the user in one or more selection processes, which identify a set of content items for presentation to the user. For example, the content selection module 235 determines measures of relevance of various content items to the user based on characteristics associated with the user by the online system 140 and based on the user's affinity for different content items. Based on the measures of relevance, the content selection module 235 selects content items for presentation to the user. As an additional example, the content selection module 235 selects content items having the highest measures of relevance or having at least a threshold measure of relevance for presentation to the user. Alternatively, the content selection module 235 ranks content items based on their associated measures of relevance and selects content items having the highest positions in the ranking or having at least a threshold position in the ranking for presentation to the user.

Content items eligible for presentation to the user may include content items associated with bid amounts. The content selection module 235 uses the bid amounts associated with ad requests when selecting content for presentation to the user. In various embodiments where content items are associated with bid amounts specifying compensation provided to the online system 140, the content selection module 235 determines an expected value associated with various content items based on their bid amounts and selects content items associated with a maximum expected value or associated with at least a threshold expected value for presentation. An expected value associated with a content item represents an expected amount of compensation to the online system 140 for presenting the content item. For example, the expected value associated with a content item is a product of the ad request's bid amount and a likelihood of the user interacting with the content item. The content selection module 235 may rank content items based on their associated bid amounts and select content items having at least a threshold position in the ranking for presentation to the user. In some embodiments, the content selection module 235 ranks both content items not associated with bid amounts and content items associated with bid amounts in a unified ranking based on bid amounts and measures of relevance associated with content items. Based on the unified ranking, the content selection module 235 selects content for presentation to the user. Selecting content items associated with bid amounts and content items not associated with bid amounts through a unified ranking is further described in U.S. patent application Ser. No. 13/545,266, filed on Jul. 10, 2012, which is hereby incorporated by reference in its entirety.

For example, the content selection module 235 receives a request to present a feed of content to a user of the online system 140. The feed may include one or more content items associated with bid amounts and other content items, such as stories describing actions associated with other online system users connected to the user, which are not associated with bid amounts. The content selection module 235 accesses one or more of the user profile store 205, the content store 210, the action log 220, and the edge store 225 to retrieve information about the user. For example, information describing actions associated with other users connected to the user or other data associated with users connected to the user are retrieved. Content items from the content store 210 are retrieved and analyzed by the content selection module 235 to identify candidate content items eligible for presentation to the user. For example, content items associated with users who not connected to the user or stories associated with users for whom the user has less than a threshold affinity are discarded as candidate content items. Based on various criteria, the content selection module 235 selects one or more of the content items identified as candidate content items for presentation to the identified user. The selected content items are included in a feed of content that is presented to the user. For example, the feed of content includes at least a threshold number of content items describing actions associated with users connected to the user via the online system 140.

In various embodiments, the content selection module 235 presents content to a user through a newsfeed including a plurality of content items selected for presentation to the user. One or more content items may also be included in the feed. The content selection module 235 may also determine the order in which selected content items are presented via the feed. For example, the content selection module 235 orders content items in the feed based on likelihoods of the user interacting with various content items.

In various embodiments, the content selection module 235 receives a request to present content to a user of the online system 140 from a client device 110 and identifies one or more groups that include the user. For example, an application associated with the online system 140 and executing on the client device 110 associated with the user requests content items provided to one or more groups that include the user, so the content selection module 235 accesses the group store 230 and identifies groups that include the user. In various embodiments, the content selection module 235 identifies group identifiers associated with an identifier associated with the user to identify groups that include the user. As further described below in conjunction with FIGS. 3 and 4, the content selection module 235 retrieves content items provided to at least a set of the identified groups. For example, the content selection module 235 determines one or more content identifiers associated with one or more group identifiers corresponding to the identified group and retrieves content items associated with the determined content identifiers from the content store 210. The content selection module 235 provides one or more of the retrieved content items to the client device 110 associated with the user, as further described below in conjunction with FIGS. 3 and 4.

Additionally, the content selection module 235 includes instructions that are communicated to a client device 110 associated with a user of the online system 140. As further described below in conjunction with FIG. 4, when the client device 110 executes the instructions, the client device 110 generates an interface presenting one or more of the retrieved content items that were provided to one or more groups including the user. Executing the instructions also causes the client device 110 to identify certain interactions performed by a user and to modify the interface in response to the interactions or to communicate information to the online system 140 in response to the interactions. For example, in response to identifying a particular gesture with a portion of a display device of the client device 110 presenting the interface, the client device 110 modifies the interface to present a different retrieved content item.

The web server 240 links the online system 140 via the network 120 to the one or more client devices 110, as well as to the one or more third party systems 130. The web server 240 serves web pages, as well as other content, such as JAVA®, FLASH®, XML and so forth. The web server 240 may receive and route messages between the online system 140 and the client device 110, for example, instant messages, queued messages (e.g., email), text messages, short message service (SMS) messages, or messages sent using any other suitable messaging technique. A user may send a request to the web server 240 to upload information (e.g., images or videos) that are stored in the content store 210. Additionally, the web server 240 may provide application programming interface (API) functionality to send data directly to native client device operating systems, such as IOS®, ANDROID™, or BlackberryOS.

Figure 3:
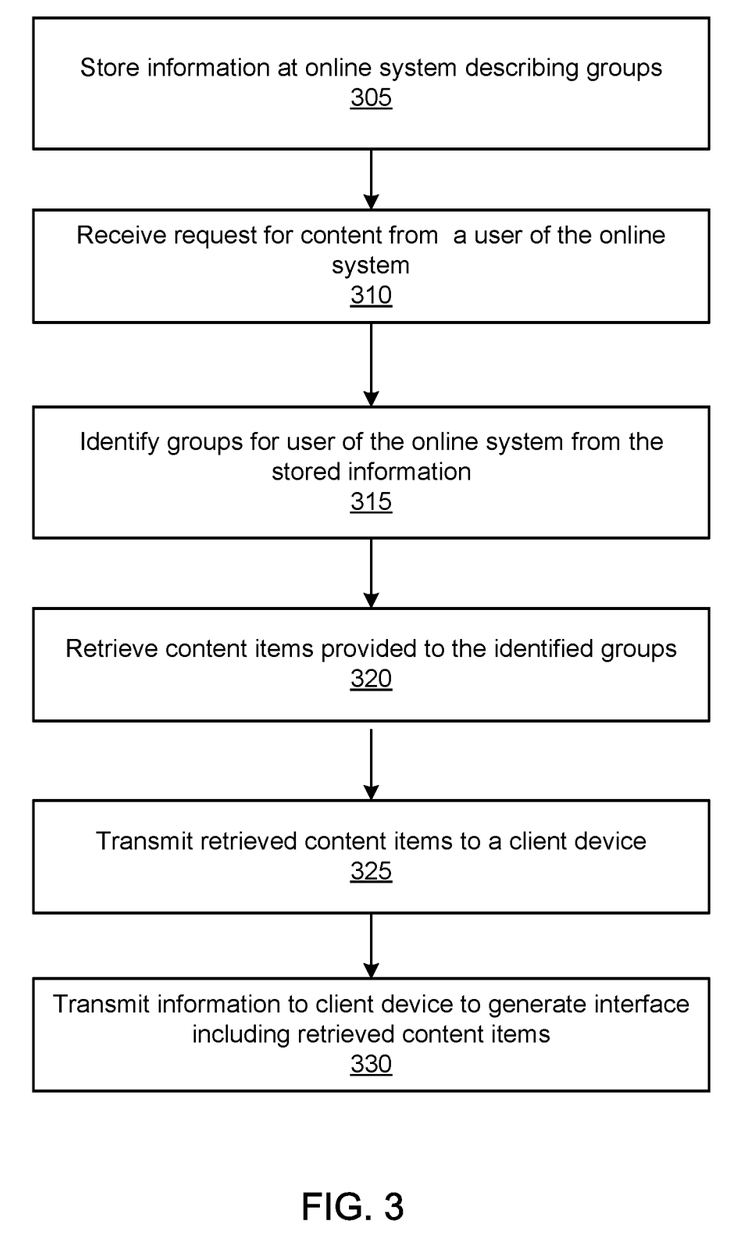
FIG. 3 is a flowchart illustrating a method of presenting content items provided to one or more groups maintained by an online system including a user to the user, in accordance with an embodiment.

Presenting Content Items Provided to One or More Groups Including a User to the User FIG. 3 is a flowchart of one embodiment of a method of presenting content items provided to one or more groups maintained by an online system including a user to the user. In various embodiments, the method may include different or additional steps than those described in conjunction with FIG. 3. Additionally, in some embodiments, the steps of the method may be performed in different orders than the order described in conjunction with FIG. 3.

An online system 140 stores 305 information describing one or more groups, with each group including one or more users of the online system 140 and associated with one or more characteristics. Users included in a group provided content associated with the group to the online system 140, which associates the content with the group and subsequently provides the content to users included in the group. Hence, when a user provides a content item to a group, the online system 140 presents the content item to various users who are included in the group, simplifying dissemination of content to various users of the online system 140.

When the online system 140 receives 310 a request for content from a client device 110 associated with a user of the online system 140, the online system 140 accesses the stored information and identifies 315 one or more groups that include the user. In some embodiments, the request includes information specifically requesting content provided to groups or the request is received 310 from a particular application executing on the client device 110 that presents content provided to groups maintained by the online system 140. To identify 315 groups including the user, the online system 140 may identify 315 group identifiers that are associated with information used by the online system 140 to identify the user (e.g., a user identifier). In some embodiments, the online system 140 identifies 315 groups including the user that satisfy one or more criteria. For example, the online system 140 identifies 315 groups that include the user and with which the user has interacted with at least a threshold amount of content items provided to the group. As another example, the online system 140 identifies 315 groups that included the user within a threshold amount of time from when the online system 140 received 310 the request. In another example, the online system 140 identifies 315 groups associated with one or more topics, which may be specified by the user and stored in a user profile maintained by the online system 140 for the user, or identifies groups that also include one or more additional users (e.g., users to whom the user has established a connection via the online system 140, users for whom the user has at least a threshold affinity).

In some embodiments, when identifying 315 the one or more groups including the user, the online system 140 identifies one or more additional groups that do not include the user. For example, the online system 140 identifies one or more groups having at least a threshold likelihood of being relevant to the user to identify groups associated with content with which the user is likely to interact or groups including users with which the user is likely to interact of interest. Identifying groups for a user allows the online system 140 to encourage the user to interact with a broader range of content items or users, which increases the amount of interaction between the user and the online system 140. In one embodiment, the online system 140 determines a score for various groups based on a model determining a likelihood of the user interacting with the group within a specified time interval. The score for a group is based on a model determining a likelihood of the user interacting with the group within a specified time interval. Various interactions between the user and other groups maintained by the online system 140 are used to determine the score for a group. For example, the user's interactions with groups having at least a threshold number of characteristics matching or similar to a group are used to determine the score for the group. Examples of interactions used to determine the score for a group include the user providing one or more content items to an additional group with similar characteristics to the group for presentation to users associated with the additional group, the user commenting on content items associated with an additional group with similar characteristics to the group, the user sharing content items associated with an additional group having similar characteristics to the group, and the user indicating a preference for a content item associated with an additional group having similar characteristics to the group. Additionally, the score associated with the group may be based in part on interactions where the user accessed content items associated with one or more groups having similar characteristics to the group. Based on the scores determined for various groups, the online system 140 identifies one or more additional groups that do not include the user. Identification of additional groups that do not include the user is further described in U.S. patent application Ser. No. 14/535,265, filed on Nov. 6, 2014, which is hereby incorporated by reference in its entirety. If the online system 140 identifies one or more additional groups that do not include the user, as further described below, the online system 140 may subsequently provide information identifying the one or more additional groups to the user, which may identify additional relevant content to the user and increase the user's interaction with the online system 140.

The online system 140 retrieves 320 content items provided to one or more of the identified groups. In some embodiments, the online system 140 retrieves 320 content items provided to each of the identified groups. Alternatively, the online system 140 retrieves 320 content items provided to each of a set of the identified groups. For example, the online system 140 retrieves 320 content items provided to identified groups to which the user has not provided content within a threshold amount of time from a current time or identified groups to which content to which content items that the user has not interacted with within a threshold amount of time from a current time were provided. In another example, the online system 140 retrieves 320 content items provided to identified groups identified in the user's user profile or retrieves 320 content items provided to identified groups satisfying at least a threshold amount of criteria included in the user's user profile (e.g., associated with topics specified by the user, including additional users identified by the user, associated with a location specified by the user, etc.). The online system 140, in some embodiments, retrieves 320 content items that were provided to one or more of the identified groups and with which the user has not interacted, or with which the user has not interacted within a threshold amount of time from the current time. For example, the online system 140 retrieves 320 content items that are associated with a group identifier corresponding to one or more of the identified groups and that are not associated with information indicating the user has accessed the content items (e.g., content items that are not identified in the action log 220 and associated with a description of one or more actions performed by the user), To provide the retrieved content items to the user, the online system 140 transmits 325 one or more of the retrieved content items and information describing identified groups to the client device 110 from which the request for content was received 310. For each retrieved content item transmitted 325 to the client device 110, the online system 140 also transmits information describing a group to which the retrieved content item was provided. As an example, the online system 140 transmits 325 a retrieved content item to the client device 110 in association with a name or a group identifier corresponding to the identified group to which the retrieve content item was provided. Hence, the online system 140 identifies retrieved content items as well identified groups to which the retrieved content items were provided, allowing the user to subsequently identify groups that include the retrieved content item.

Additionally the online system 140 transmits 330 instructions to the client device 110 from which the request was received 310 that, when executed by the client device 110, generate an interface including one or more of the retrieved content items. In various embodiments, the interface also includes information identifying one or more of the identified groups. For example, executing the instructions causes the client device 110 to present one or more of the retrieved content items in a portion of a display device of the client device 110 and to present information identifying one or more of the identified groups in an additional portion of the display device of the client device 110. In some embodiments, the interface presents a representation of a retrieved content item in the portion of the display device 110 and presents representations of one or more additional retrieved content items in the portion of the display device behind the representation of the retrieved content item; such an implementation presents various retrieved content items as if they are stacked on one another within the portion of the display device. The interface may also present information describing various identified groups in the additional portion of the display device as a list in the additional portion of the display device. For example, the additional portion of the display device includes a list of names of various identified groups. In some embodiments, the interface orders the list so information describing identified groups that include the user is presented adjacent to each other while information describing additional groups that do not include the user is presented adjacent to each other. Including additional groups that do not include the user in the interface allows the online system 140 to inform the user of the additional groups to increase the user's awareness of the additional groups.

Additionally, executing the instructions causes the client device 110 to identify one or more interactions received from the user and perform actions or provide information to the online system 140 based on the identified one or more interactions. For example, if the client device 110 receives one or more interactions with the portion of the display device presenting a representation of a retrieved content item, the client device 110 replaces the representation of the retrieved content item presented by the portion of the display device with a representation of an alternative retrieved content item. For example, if the client device 110 receives a particular gesture with the portion of the display device from the user, the client device 110 modifies the portion of the display device to present a representation of another retrieved content item that was initially presented behind the portion of the retrieved content item. In some embodiments, the client device 110 transmits a description of a received interaction to the online system 140, which stores 335 the interaction in association with the user and with the retrieved content item. For example, after receiving the particular gesture with the portion of the display device from the user presenting the representation of the retrieved content item, in addition to presenting the representation of the alternative content item, the client device 110 transmits an indication that the user has accessed the retrieved content item to the online system 140, which stores 335 an indication that the user has accessed the retrieved content item in association with the retrieved content item and with the user.

The client device 110 performs various actions depending on received user interactions with the interface. For example, if the user performs an alternative gesture with the portion of the display device presenting the representation of the retrieved content item, the client device 110 communicates an instruction to store the retrieved content item for subsequent presentation to the user that identifies the retrieved content item and the user to the online system 140. The online system 140 subsequently stores the retrieved content item in association with the user along with an indication to later present the retrieved content item to the user. The client device 110 may present a representation of another content item after storing the retrieved content item or communicating the instruction to the online system 140. In other embodiments, in response to receiving the alternative gesture, the client device 110 stores the retrieved content item in a local storage device for subsequent presentation to the user. As another example, if the client device 110 receives an additional interaction with the portion of the display device presenting the representation of the retrieved content item, the client device 110 obtains and presents the retrieved client device to the user. Interaction with the interface generated by the client device 110 is further described below in conjunction with FIG. 4. Hence, the online system 140 provides content and instructions to the client device 110 that allow the user to more easily identify and interact with content items provided to groups maintained by the online system 140 that include the user (or that are likely to be of interest to the user), increasing likelihoods of the user interacting with the content items.

Figure 4:
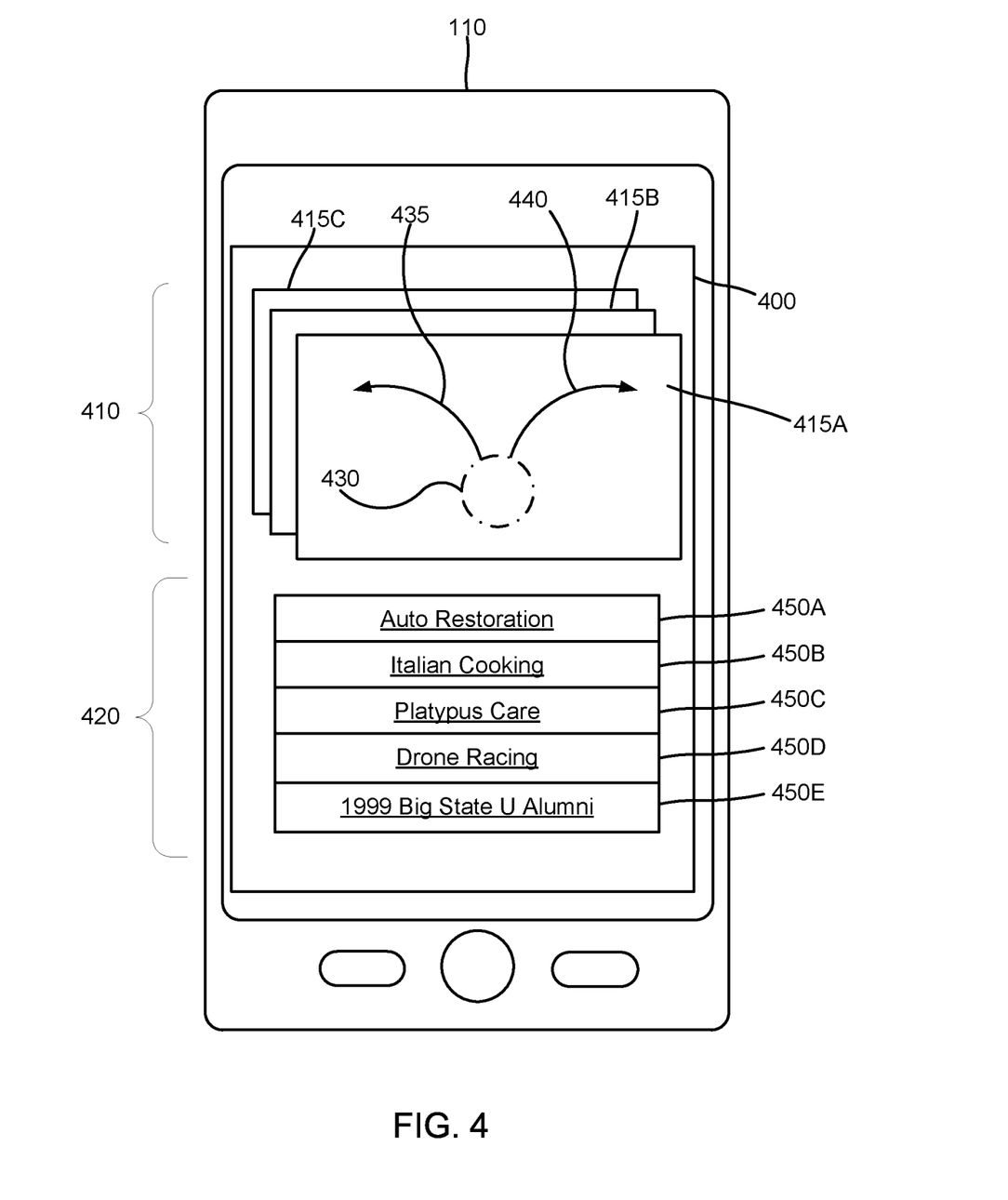
FIG. 4 is an example interface presenting content items provided to groups maintained by an online system that include a user, in accordance with an embodiment of the disclosure.

Example Interface Presenting Content Items Provided to Groups Including a User to the User FIG. 4 is an example interface 400 presenting content items provided to groups maintained by an online system that include a user. In the example of FIG. 4, the interface 400 is presented on a display device of a client device 110. The interface 400 comprises a portion 410 that presents representations 415A, 415B, 415C (also referred to individually and collectively using reference number 415), and an additional portion 420 that includes information identifying groups 450A, 450B, 450C, 450D, 450E (also referred to individually and collectively using reference number 450). As further described above in conjunction with FIG. 3, the client device 110 receives content items from the online system 140 that were provided to groups including the user (or to groups in which the online system 140 determines the user is likely to have an interest). A representation 415 of a content item includes content from the content item, such as a subset of content included in the content item, and may also include information identifying a user who provided the content item to a group as well as an identifier of the group. In the example shown by FIG. 4, the portion 410 presents a representation 415A of a content item and presents representations 415B, 415C of one or more additional content items behind the representation 415A of the retrieved content item. For example, the portion 410 of the interface 400 presents representations 415A, 415B, 415C of various content items so the representations 415A, 415B, 415B of the content items appear to be stacked on one another; hence, a representation 415A of a content item is visible via the portion 410, while additional representations 415B, 415C of content items are partially visible in the portion and appear to be behind the representation 415A of the content item.

In various embodiments, the portion 410 of the interface 400 presents representations 415 of content items provided to a particular group 450, such as a group 450 corresponding to information presented in the additional portion 420 of the interface selected by the user. Alternatively, the portion 410 of the interface 400 presents representations 415 of content items satisfying one or more criteria; as an example, the portion 410 of the interface 400 includes representations of content items 415 received within a particular time interval. The representations 415 of content items may be arranged in any suitable order in various embodiments. For example, the interface 400 arranges representations 415 of content items more recently provided by a group are presented via the portion 410 of the interface 400 before representations 415 of content items less recently provided by a group. As another example, the interface 400 presents representations of 415 content items for which the online system 140 has received a greater number of interactions (or interactions from a greater number of users) than representations 415 of content items for which the online system 140 has received a fewer number of interactions (or interactions from a fewer number of users). In other embodiments, the user provides criteria to the online system 140 for determining an order in which representations 415 of content items are presented via the portion 410 of the interface 400.

The additional portion 420 of the interface 400 information identifying groups 450 identified by the online system 140. As further described above in conjunction with FIG. 3, the online system 140 may identify groups 450 including the user as well as additional groups 450 that do not include the user but have at least a threshold likelihood of being of interest to the user. The online system 140 provides information describing the identified groups 450 to the client device 110, which presents information identifying the groups 450 via the additional portion 420 of the interface 400. In the example of FIG. 4, the additional portion 420 of the interface 400 presents names of the groups 450; in some embodiments, the additional portion 420 presents an image, such as a profile picture, of a group 450 in conjunction with a name of the group 450. For purposes of illustration, FIG. 4 shows an example interface 400 presenting names of groups 450 as a list, but in other embodiments, information identifying the groups 450 may be presented using any suitable format. In some embodiments, the additional portion 420 of the interface 400 organizes information identifying groups 450 into different sets and presents information identifying groups 450 organized based on the sets including various groups 450. For example, the interface 400 presents information identifying groups 450 that include the user adjacent to each other and presents information identifying groups 450 that do not include the user adjacent to each other. As an example, groups 450A, 450B, 450C in FIG. 4 are groups that include the user, so information identifying groups 450A, 450B, 450C is presented adjacent to each other via the additional portion 420 of the interface 400; however, groups 450D, 450E do not include the user, but were determined by the online system 140 to have at least a threshold likelihood of being of interest to the user. Accordingly, information identifying groups 450D, 450E are presented adjacent to each other via the additional portion of the interface 400.

Additionally, as described above in conjunction with FIG. 3, the client device 110 identifies various interactions with the interface 400 by the user and modifies content presented by the portion 410 or by the additional portion 420 of the interface 400 based on identified interactions. For example, if the client device 110 receives an interaction 430 where the user contacts the portion 410 of the interface 400 for at least a threshold amount of time, the client device 110 modifies the interface 400 to present the content item corresponding to the representation 415A presented in the portion 410 of the interface 400. As another example, if the client device 110 identifies a gesture 435 by the client from a position within the portion 410 of the interface 400 to an additional position within the portion 410 of the interface (e.g., the user contacting the position within the portion 410 of the interface and gesturing to another position to the left of the position), the client device 110 replaces the representation 415A of the retrieved content item presented by the portion 410 of the interface 400 with another representation 415B, 415C of a different content item. Referring to the example of FIG. 4, if the client device 110 identifies the gesture 435, the client device 110 modifies the portion 410 of the interface to present the representation 415B of another content item rather than the representation 415A of the content item. Additionally, when the client device 110 receives the gesture 435, the client device 110 communicates an indication to the online system 140 identifying the content item and the user that indicates the user has accessed the content item, allowing the online system 140 to determine when the user has accessed the content item.

However, if the if the client device 110 identifies an alternative gesture 440 by the client from a position within the portion 410 of the interface 400 to an alternative position within the portion 410 of the interface (e.g., the user contacting the position within the portion 410 of the interface and gesturing to another position to the right of the position), the client device 110 communicates an instruction identifying the content item corresponding to the representation 415A presented in the portion 410 of the interface 400 and the user to the online system 140 that causes the online system to store the content item in association with the user along with an indication to later present the content item to the user. Alternatively, when the client device 110 identifies the alternative gesture 440, the client device 110 locally stores the content item corresponding to the representation 415A presented in the portion 410 of the interface 400, allowing the user to later retrieve the content item from the client device 110. After storing or communicating the instruction to the online system 140, the client device 110 replaces the representation 415A of the retrieved content item presented by the portion 410 of the interface 400 with another representation 415B, 415C of a different content item.

Additionally, if the client device 110 receives an interaction where the user accesses information in the additional portion 420 of the client device 110 identifying a group 450, the client device 110 modifies the portion 410 of the interface 400 to present representations 415 of content items provided to the group 450 corresponding to the accessed information. In the example of FIG. 4, if the user accesses information in the additional portion 420 of the client device 110 identifying a group 450A, the client device 110 modifies the portion 410 of the interface 400 to present content items provided to the group 450A. Hence, accessing information identifying different groups 450 allows the user to view content items that were provided to different groups 450 maintained by the online system 140 via the interface 400.

Conclusion

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the patent rights. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:

1. A method comprising:
storing information in an online system describing one or more groups, each group including one or more users of the online system and associated with one or more characteristics;
receiving a request for content from a client device associated with a user of the online system;
identifying groups including the user from the stored information and in which the user was included within a threshold amount of time from a time when the online system received the request;
retrieving content items provided to one or more of the identified groups including the user;
transmitting one or more of the retrieved content items to the client device associated with the user, a retrieved content item associated with information identifying an identified group to which the retrieved content item was provided;
transmitting information describing one or more of the identified groups to the client device; and
transmitting instructions to the client device that, when executed by the client device, cause the client device to generate an interface that presents representations of one or more of the retrieved content items transmitted to the client device in a portion of a display device of the client device and presents the information describing one or more of the identified groups in an additional portion of the display device of the client device.

2. The method of claim 1, wherein identifying groups including the user from the stored information comprises:
identifying groups including the user and satisfying one or more criteria from the stored information.

3. The method of claim 2, wherein the one or more criteria are selected from a group consisting of: including at least a threshold amount of content items with which the user interacted, inclusion of one or more additional users for whom the user has at least a threshold affinity, association with one or more topics, inclusion of one or more additional users connected to the user, and any combination thereof.

4. The method of claim 1, further comprising:
receiving a description of an interaction by the user with a representation of a retrieved content item presented by the interface from the client device; and
storing the description of the interaction in association with the user and with the retrieved content item.

5. The method of claim 4, wherein the description of the interaction by the user with the representation of the retrieved content item comprises an indication the user accessed the retrieved content item corresponding to a gesture by the user with the portion of a display device.

6. The method of claim 4, wherein the description of the interaction by the user with the representation of the retrieved content item comprises an instruction to store the retrieved content item for subsequent presentation to the user.

7. The method of claim 6, further comprising:
storing the retrieved content item in association with the user along with an indication to later present the retrieved content item to the user.

8. The method of claim 1, wherein identifying groups including the user from the stored information comprises:
identifying the groups including the user from the stored information; and
identifying one or more additional groups that do not include the user based on likelihoods of the user interacting with the group within a specified time interval from the stored information.

9. The method of claim 8, wherein identifying one or more additional groups that do not include the user based on likelihoods of the user interacting with the group within a specified time interval from the stored information comprises:
identifying groups having at least a threshold number of characteristics matching a group including the user;
determining interactions by the user with the groups having at least the threshold number of characteristics matching the group including the user;
determining a score for each of the groups having at least the threshold number of characteristics matching the group including the user, the score for a group having at least the threshold number of characteristics matching the group including the user based on interactions by the user with the group having at least the threshold number of characteristics matching the group including the user; and
selecting the one or more additional groups of the groups having at least the threshold number of characteristics matching the group including the user based on the scores.

10. A computer program product comprising a non-transitory computer-readable storage medium having instructions encoded thereon that, when executed by a processor, cause the processor to:
obtain representations of one or more content items, each content item provided to a group maintained by an online system and identified for a user of the online system;
obtain information describing one or more of the groups including the user and in which the user was included within a threshold amount of time from a time when the online system received the request;
present a representation of a content item in a portion of a display device of a client device including the processor;
present the information describing one or more of the groups in an additional portion of the display device;
identify an interaction received from the user via the client device with the portion of the display device or with the additional portion of the display device; and
modify content presented by the portion or by the additional portion of the display device in response to the identified interaction.

11. The computer program product of claim 10, wherein identify the interaction received from the user via the client device with the portion of the display device or with the additional portion of the display device comprises:
identify a gesture by the user contacting the portion of the display device.

12. The computer program product of claim 11, wherein modify content presented by the portion or by the additional portion of the display device in response to the identified interaction comprises:
present a representation of an alternative content item in the portion of the display device; and
transmit an indication the user accessed the content item to the online system.

13. The computer program product of claim 11, wherein identify the interaction received form the user via the client device with the portion of the display device of with the additional portion of the display device further comprises:
identify an alternative gesture by the user contact the portion of the display device.

14. The computer program product of claim 13, wherein the gesture comprises movement across the portion of the display device from a position of the portion to an additional position of the portion, and the alternative gesture comprises movement across the portion of the display device from the position to an alternative position of the portion.

15. The computer program product of claim 13, wherein modify content presented by the portion or by the additional portion of the display device in response to the identified interaction comprises:

transmitting an instruction to the online system to store the content item for later presentation to the user, the instruction identifying the content item and the user to the online system.

16. The computer program product of claim 15, wherein modify content presented by the portion or by the additional portion of the display device in response to the identified interaction comprises further comprises:

present a representation of an alternative content item in the portion of the display device.

17. The computer program product of claim 13, wherein modify content presented by the portion or by the additional portion of the display device in response to the identified interaction comprises:

store the content item on the client device for later presentation to the user.

18. The computer program product of claim 10, wherein modify content presented by the portion or by the additional portion of the display device in response to the identified interaction comprises:

present the content item corresponding to the representation presented in the portion of the display device in response to the identified interaction comprising a particular gesture.

19. The computer program product of claim 10, wherein present the information describing one or more of the groups in the additional portion of the display device comprises:

present a list of names of each of at least a set of the groups in the additional portion of the display device.

20. The computer program product of claim 10, wherein the non-transitory computer readable storage medium further has instructions encoded thereon that, when executed by the processor, cause the processor to:

receive an interaction with information describing a group presented in the additional portion of the display device;

retrieve content items provided to the group; and present the retrieved content items via the display device.

* * * * *